Patented Oct. 27, 1953

2,657,186

UNITED STATES PATENT OFFICE 2,657,186

COMPOSITION COMPRISING A POLYVINYL CHLORIDE RESIN, A PLASTICIZER AND A VISCOSITY CONTROLLING AGENT

David X. Klein, Passaic, and Mark N. Curgan, Clifton, N. J., assignors to Heyden Chemical Corporation, New York, N. Y., a corporation of Delaware No Drawing. Application October 12, 1949, Serial No. 121,062

8 Claims. (Cl. 260—23)

Our invention relates particularly to a process of controlling the viscosity of polyvinyl chloride resin compositions, such for instance as plastisols, so as to control or lower the viscosity thereof, and so as to enable the same to be effectively applied as a coating to a base material, such as fabrics, paper, metal foil, etc., and the products thereof.

Plastisol is a resin composition containing a polyvinyl chloride resin, a plasticizer, with or without stabilizers and pigments but containing no diluents that are volatile materials. Generally, a plastisol may be applied to the base material by spread-coating, spraying, etc., and the deposited film or coating may, if desired, be heated, for instance, to about 350° F., to bring about solution of the plasticizer in the resin and thus form an effective continuous film on the base material.

We have found that the viscosity of plastisols can be brought to a workable level by the addition of a polyhydric alcohol derivative or derivative of polyhydric alcohols which have a viscosity lowering effect on polyvinyl chloride resin compositions containing a plasticizer. While it is difficult to lower the viscosity of vinyl chloride compositions, it has been found that the valuable and highly desirable property of flowability is imparted to these compositions by incorporating therein substances of the following general types: (a) long chain fatty acid esters of polyoxyalkenes such as poly ethylene glycols, (b) long chain fatty ethers of polyoxyalkenes, (c) partial higher fatty acid esters of polyhydric alcohols, (d) partial higher fatty acid esters of polyoxyalkene derivatives of polyhydric alcohols, such as, polyoxyalkene derivatives of sorbitan monolaurate, (e) polyoxyalkenes, and (f) polyoxyalkene ethers of phenols. The effectiveness of compounds of this type appears dependent upon the ratio of hydrophilic to hydrophobic groups in the molecule.

The second group thereof includes various nitrogen-containing compounds as set forth in our co-pending application upon Plastisols Containing Nitrogenous Viscosity Controlling Agents, executed July 7, 1949, Ser. No. 121,061, filed October 12, 1949.

Substantially solvent-free vinyl resin compositions are to be preferred as a coating for cloth or paper since they avoid the hazards and expense resulting from the use of solvents. Also, certain difficulties in application have arisen from the fact that plastisols are frequently quite viscous and cannot be easily applied to fabrics, previous attempts to produce a product having a workable viscosity by the use of excessive amounts of plasticizer having generally resulted in films that are too soft and tacky to be of practical use.

Vinyl resins applied to fabrics and paper from solutions in organic solvents are tough, durable and resistant to chemical attack, but their cost is prohibitive for most applications because the solvents required are expensive and the viscosity of the resin is such that the solid content of the solution must be low, thus making it necessary to apply many coats in order to build up an adequate film thickness. In addition, such films are subject to blistering during the solvent removal step at the elevated temperatures generally applied thereto.

Difficulties have arisen in the application of this type of coating, as plastisols are often too viscous to be practical in use. Attempts to reduce the viscosity of such compositions by the addition of excessive amount of the plasticizer or small amounts of solvent have been unsuccessful.

In accordance with my invention, by the presence of the said viscosity lowering agents, it is also possible to decrease the total amount of the plasticizer used. Furthermore, as a result of the lowered viscosity, the knife coating lines are eliminated, which have previously been apparent when a knife coater is used in coating the fabric, etc., and the air bubbles which tend to form during the preparation of the plastisol, and which were previously removed by deaeration under a vacuum, are diminished or eliminated.

While our invention is capable of embodiment in many different ways, for the purpose of illustration we may proceed as follows in accordance therewith, by way of example.

While any of the plastisols above referred to may be used, we may prepare a plastisol in the following manner for the Examples 1 to 21, the proportions given being by weight unless otherwise specified:

I prepare a mixture comprising

| | Parts by wt. |
|---|---|
| Geon resin 121 (a polyvinyl chloride resin) | 133 |
| Flexol DOP (comprised of di 2-ethylhexyl phthalate) | 83.25 |
| Stabilizer SN (consisting of an equal weight solution of active ingredient in a plasticizer carrier with the active ingredient consisting of strontium salts of acids consisting of about 90% naphthenic acid and about 10% 2-ethyl hexoic acid) | 2 |
| A color mix | 15 |

The color mix used in this formulation may comprise

| | Parts by wt. |
|---|---|
| Flexol DOP (di 2-ethylhexyl phthalate) | 30 |
| White lead | 15 |
| Garland green pigment | 45 |

The said color is ground on a 3-roll mill until finely dispersed. It is then stirred into the plastisol mixture by hand with a paddle until it becomes homogeneous.

Viscosity readings are taken, using the Brookfield Synchro-Lectric viscosimeter with the #4 spindle. The results are reported in the following table.

Similar mixes containing 2% by weight of the viscosity reducing agents mentioned in Examples 2 to 7 and 9 to 21 are prepared. In each case, after the mixture has been hand stirred herewith until it is homogeneous, readings are taken on the said Brookfield viscosimeter. In certain instances additional viscosity readings are taken when possible after the 24-hour aging period. These readings are reported as to the following Examples 1 to 21:

*Viscosity reducing agent*

Ex. 1—None
Ex. 2—A polyoxyalkylene derivative of sorbitan monooleate with a calculated molecular weight of 1308
Ex. 3—Sorbitan monooleate
Ex. 4—A polyoxyalkylene derivative of sorbitan monolaurate with a calculated molecular weight of 1226
Ex. 5—Polyoxyethylenestearate with a calculated molecular weight of 640
Ex. 6—Polyoxyethylene with a molecular weight of 1500
Ex. 7—Pentaerythritol mono ester of soybean fatty acids

VISCOSITY (CENTIPOISES)

| Ex. No. | Initial R. P. M. of Spindle | | | | After 24 Hrs. R. P. M. of Spindle | | | |
|---|---|---|---|---|---|---|---|---|
| | 6 | 12 | 30 | 60 | 6 | 12 | 30 | 60 |
| 1 | 69,000 | 46,000 | >20,000 | | 44,000 | 32,500 | >20,000 | |
| 2 | 45,000 | 31,750 | >20,000 | | 42,500 | 32,500 | >20,000 | |
| 3 | 45,000 | 32,500 | >20,000 | | | | | |
| 4 | 42,500 | 30,000 | >20,000 | | 42,500 | 32,500 | >20,000 | |
| 5 | 42,500 | 29,750 | >20,000 | | 21,000 | 17,500 | 14,000 | 10,000 |
| 6 | 46,000 | 31,750 | >20,000 | | 41,000 | 31,000 | 30,000 | |
| 7 | 46,000 | 31,000 | 18,600 | >10,000 | | | | |

The following are examples prepared with a later sample of Geon 121 admixed as above:

*Viscosity reducing agent*

Ex. 8—None
Ex. 9—A polyoxyalkylene derivative of dipentaerythritol monooleate with a calculated molecular weight of 738
Ex. 10—A polyoxyalkylene derivative of tripentaerythritol monooleate with a calculated molecular weight of 2220
Ex. 11—Polyoxyethylenestearate with a calculated molecular weight of 640
Ex. 12—Polyoxyethylene ether of cetyl alcohol with a molecular weight of 602
Ex. 13—A polyoxyethylene ether of a fatty alcohol
Ex. 14—A polyoxyethylene ether of a fatty alcohol (not Ex. 13)
Ex. 15—Polyoxyethylene ester of a fatty acid with a molecular weight of 300
Ex. 16—Polyoxyethylene ester of a fatty acid with a molecular weight of 834
Ex. 17—Polyoxyethylene ester of a fatty acid
Ex. 18—Polyoxyethylene ester of a fatty acid (not Ex. 17)
Ex. 19—An octyl phenoxy polyoxyethylene derivative with a molecular weight of 321
Ex. 20—An octyl phenoxy polyoxyethylene derivative with a molecular weight of 338
Ex. 21—An octyl phenoxy polyoxyethylene derivative with a molecular weight of 426

VISCOSITY (CENTIPOISES)

| Ex. No. | R. P. M. of Spindle | | | |
|---|---|---|---|---|
| | 2 | 4 | 10 | 20 |
| 8 | 33,600 | 29,700 | >20,000 | |
| 9 | 15,500 | 12,600 | 11,500 | 9,750 |
| 10 | 13,900 | 11,500 | 9,620 | 9,120 |
| 11 | 16,000 | 14,500 | 13,500 | >10,000 |
| 12 | 15,000 | 12,600 | 10,200 | 9,350 |
| 13 | 17,500 | 15,150 | 13,100 | >10,000 |
| 14 | 14,500 | 11,600 | 10,720 | >10,000 |
| 15 | 14,000 | 14,250 | 12,100 | >10,000 |
| 16 | 18,500 | 15,250 | 12,100 | >10,000 |
| 17 | 20,300 | 16,750 | 13,700 | >10,000 |
| 18 | 17,500 | 15,100 | 13,200 | >10,000 |
| 19 | 24,500 | 19,000 | 15,500 | >10,000 |
| 20 | 19,700 | 17,000 | 14,500 | >10,000 |
| 21 | 18,500 | 15,250 | 12,800 | >10,000 |

Instead of the above plastisol used in Examples 1 to 21 we may, for the following Examples 22 to 26, utilize a plastisol made as follows, the proportions given being by weight unless otherwise specified.

In these Examples 22 to 26, vinyl chloride resin VYNV-2, a copolymer containing more than 95% polyvinyl chloride and less than 5% of polyvinyl acetate, is used. This plastisol, which is prepared by grinding together the ingredients on a 3-roll mill until they are finely dispersed and then hand stirring the mixture, has the following composition:

| | Parts by wt. |
|---|---|
| Vinyl resin VYNV-2 | 100 |
| Flexol plasticizer DOP (di 2-ethylhexyl-phthalate) | 45 |
| Color grind (of any desired pigments) | 10 |

The color grind is prepared by grinding the following ingredients on a 3-roll mill:

| | Parts by wt. |
|---|---|
| Flexol plasticizer DOP | 50 |
| Garland green pigment | 40 |
| Titanium dioxide pigment | 10 |

The viscosity of the plastisol is determined using the Brookfield Synchro-Lectric viscosimeter with the #4 spindle. Then similar mixes are prepared which contain 2% of a viscosity reducing agent such as the following. Viscosity data on these plastisols are tabulated for the following examples:

*Viscosity reducing agent*

Ex. 22—None
Ex. 23—A polyoxyethylene derivative of sorbitan monooleate with a calculated molecular weight of 1308

Ex. 24—Sorbitan monooleate
Ex. 25—A polyoxyethylene derivative of sorbitan monolaurate with a calculated molecular weight of 1226
Ex. 26—Polyoxyethylenestearate with a calculated molecular weight of 640

VISCOSITY (CENTIPOISES)

| Ex. No. | Initial R. P. M. of Spindle | | | | After 24 Hrs R. P. M. of Spindle. | | | |
|---|---|---|---|---|---|---|---|---|
| | 6 | 12 | 30 | 60 | 6 | 12 | 30 | 60 |
| 22 | 45,000 | 35,000 | 20,000 | | | | | |
| 23 | 7,200 | 8,100 | 8,000 | 7,790 | 8,000 | 9,000 | 9,200 | 8,700 |
| 24 | 9,500 | 11,750 | 10,420 | 10,000 | 6,000 | 7,500 | 6,000 | 4,700 |
| 25 | 13,200 | 15,000 | 14,400 | 10,000 | 15,000 | 14,500 | 12,000 | 10,000 |
| 26 | 23,800 | 20,500 | 14,340 | 10,000 | 20,000 | 19,500 | 18,600 | 10,000 |

The limitations of the amount of viscosity reducing agent desirable to be used in the practice of this invention depend upon the type of resin employed and the amount and type of plasticizers used, and also upon the presence of pigments, stabilizers and other materials commonly included in vinyl resin formulations. It has been found, however, that the use of approximately 0.5 to 5% of the agent is preferable, with 1 to 2% being the most preferred range.

The compositions described in the above examples have been applied to cloth by means of a roller-coater or a doctor blade, cured and then embossed while still hot, and finally cooled. In each case the product is a smoothly coated fabric.

In addition to their use in paper and cloth coating, the vinyl compositions described in this invention have found use in dip molding, slush molding, and flush molding processes. When dip molding techniques are employed it is often possible to build up in a single dipping film thicknesses of as much as 3/32", thus lowering the cost of the operation considerably. In slush or flush molding applications these plastisols are quite versatile. Since they contain no solvent which can be entrapped, the construction of the mold is simplified and intricate objects can be prepared without difficulty. In general, the procedure in slush molding involves charging the material into the mold, curing at approximately 350° F. for 15 minutes to produce a homogeneous product, removing the mold from the oven, and cooling. The vinyl film is then removed from the mold.

While we have described our invention above in detail it is to be understood that many changes may be made therein, for instance as to proportions, temperatures, time intervals, etc., without departing from the spirit of our invention.

We claim:

1. A polyvinyl chloride resin composition containing a plasticizer, said composition having its viscosity lowered by an agent selected from the group consisting of long chain fatty acid esters of polyoxyalkylenes, long chain fatty ethers of polyoxyalkylenes, partial long chain fatty acid esters of polyoxyalkylene ethers of polyhydric alcohols, polyoxyalkylenes having an average molecular weight of at least 1500, and nuclear long chain alkylated polyoxyalkylene ethers of phenols.

2. A polyvinyl chloride resin composition containing a plasticizer, said composition having its viscosity lowered by 0.5 to 5% of an agent selected from the group consisting of long chain fatty acid esters of polyoxyalkylenes, long chain fatty ethers of polyoxyalkylenes, partial long chain fatty acid esters of polyoxyalkylene ethers of polyhydric alcohols, polyoxyalkylenes having an average molecular weight of at least 1500, and nuclear long chain alkylated polyoxyalkylene ethers of phenols.

3. A polyvinyl chloride resin composition containing a plasticizer, said composition having its viscosity lowered by polyoxyethylene stearate.

4. A polyvinyl chloride resin composition containing a plasticizer, said composition having its viscosity lowered by an agent consisting of a partial long chain fatty acid ester of a polyoxyalkylene ether of a polyhydric alcohol.

5. A polyvinyl chloride resin composition containing a plasticizer, said composition having its viscosity lowered by an agent consisting of a long chain fatty ether of a polyoxyalkylene.

6. A polyvinyl chloride resin composition containing a plasticizer, said composition having its viscosity lowered by an agent consisting of a polyoxyethylene ether of cetyl alcohol.

7. A polyvinyl chloride resin composition comprising polyvinyl chloride resin and a plasticizer, the composition having its viscosity lowered by a long chain fatty acid ester of a polyoxyalkylene.

8. A polyvinyl chloride resin composition comprising polyvinyl chloride resin and a plasticizer, the composition having its viscosity lowered by a polyoxyalkylene ether of sorbitan monolaurate.

DAVID X. KLEIN.
MARK N. CURGAN.

References Cited in the file of this patent
UNITED STATES PATENTS

| Number | Name | Date |
|---|---|---|
| 2,025,048 | Graves | Dec. 24, 1935 |
| 2,285,420 | Doolittle | June 9, 1942 |
| 2,431,078 | Powell et al. | Nov. 18, 1947 |
| 2,435,464 | Radcliffe | Feb. 3, 1948 |
| 2,459,746 | Radcliffe | Jan. 18, 1949 |
| 2,518,442 | Scheiderbauer | Aug. 15, 1950 |
| 2,528,507 | Foye | Nov. 7, 1950 |